(12) United States Patent
Sato

(10) Patent No.: US 8,271,221 B2
(45) Date of Patent: Sep. 18, 2012

(54) PHASE DETECTION DEVICE AND POSITION DETECTION DEVICE

(75) Inventor: Shouichi Sato, Izunokuni (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 346 days.

(21) Appl. No.: 12/593,002

(22) PCT Filed: Mar. 26, 2008

(86) PCT No.: PCT/JP2008/055656
§ 371 (c)(1),
(2), (4) Date: Sep. 25, 2009

(87) PCT Pub. No.: WO2008/123279
PCT Pub. Date: Oct. 16, 2008

(65) Prior Publication Data
US 2010/0088053 A1    Apr. 8, 2010

(30) Foreign Application Priority Data

Mar. 26, 2007 (JP) .................................. 2007-079529

(51) Int. Cl.
*G06F 19/00* (2011.01)
(52) U.S. Cl. ................. 702/72; 702/66; 702/70; 702/94; 702/151; 702/150
(58) Field of Classification Search ...................... 702/72
See application file for complete search history.

(56) References Cited

U.S. PATENT DOCUMENTS 3,582,780 A * 6/1971 Hole ........................... 324/76.82

| | | |
|---|---|---|
| 4,975,626 A | 12/1990 | Yagi |
| 5,086,261 A | 2/1992 | Sakata |

(Continued)

FOREIGN PATENT DOCUMENTS

EP    0877464    11/1998

(Continued)

OTHER PUBLICATIONS

English language translation Abstract of JP-03-072218.

(Continued)

*Primary Examiner* — Cindy H Khuu
*Assistant Examiner* — Timothy H Hwang
(74) *Attorney, Agent, or Firm* — DLA Piper LLP (US)

(57) ABSTRACT

Provided is a phase detection device which can detect a phase by using a simple configuration. The phase detection device 5 has the section specifying part 27 specifying which of the eight sections obtained by dividing a range from 0 to $2\pi$ for each $\pi/4$ from 0 contains the phase $\theta$ based on the sign of the sine wave signal Ssa, the sign of the cosine wave signal Sca, and the magnitude relationship between the absolute value of the sine wave signal Ssa and the absolute value of the cosine wave signal Sca, and the arctangent calculation part 37 adjusting the signs of the sine wave signal Ssa and the cosine wave signal Sca and making one of the sine wave signal Ssa and the cosine wave signal Sca a sine wave and making the other a cosine wave so that the sign of the sine wave, the sign of the cosine wave, and the magnitude relationship between the absolute value of the sine wave and the absolute value of the cosine wave coincide regardless of which of the eight sections contains the phase $\theta$, thereby calculating the arctangent of the tangent based on the sine wave and the cosine wave according to a procedure common to the eight parts.

4 Claims, 8 Drawing Sheets

U.S. PATENT DOCUMENTS

| | | | |
|---|---|---|---|
| 5,304,907 A | | 4/1994 | Abe |
| 5,433,541 A | | 7/1995 | Hieda |
| 5,786,781 A | * | 7/1998 | Taniguchi et al. ............ 341/111 |
| 5,949,359 A | | 9/1999 | Vlahu |
| 6,424,147 B1 | * | 7/2002 | Kato et al. ................. 324/207.2 |
| 6,433,496 B1 | | 8/2002 | Kawagoshi |
| 6,598,196 B1 | * | 7/2003 | Bussard et al. ............... 714/746 |
| 2007/0127596 A1 | * | 6/2007 | Kang et al. .................... 375/316 |
| 2007/0288187 A1 | * | 12/2007 | Finkler et al. ................... 702/94 |

FOREIGN PATENT DOCUMENTS

| | | |
|---|---|---|
| JP | 03-072218 | 3/1991 |
| JP | 03-120420 | 5/1991 |
| JP | 09-257410 | 10/1997 |
| JP | 11-051692 | 2/1999 |
| JP | 2000-055695 | 2/2000 |
| JP | 2006-194766 | 7/2006 |

OTHER PUBLICATIONS

English language translation Abstract of JP-09-257410.
English language translation Abstract of JP-03-120420.
English language translation Abstract of JP-11-051692.
Machine English language translation of JP-09-257410.
Machine English language translation of JP-11-051692.
U.S. Appl. No. 12/295,847 electronically captured on Feb. 7, 2012.
Korean Office Action issued in KR 10-209-7022315 on Oct. 26, 2011.
English Language Translation of Korean Office Action issued in KR 10-209-7022315 on Oct. 26, 2011.
English Language Abstract and Translation of JP 2000-055695 published on Feb. 25, 2000.
International Search Report of PCT/JP2008/055656, mailed Jun. 24, 2008.
English language translation Abstract of JP-03-072218, (1991).
English language translation Abstract of JP-09-257410, (1997).
English language translation Abstract of JP-2006-194766.
English language translation Abstract of JP-03-120420, (1991).
English language translation Abstract of JP-11-051692, (1999).
Machine English language translation of JP-09-257410, (1997).
Machine English language translation of JP-11-051692, (1999).
Machine English language translation of JP-2006-194766.

* cited by examiner

FIG. 3

| SECTION | ANGLE(°) | $\sin\theta<0$ | $-\cos\theta<0$ | $|\sin\theta|\geqq|-\cos\theta|$ | $\theta$ |
|---|---|---|---|---|---|
| P1 | 0~45 | 0 | 1 | 0 | $+\theta'$ |
| P2 | 45~90 | 0 | 1 | 1 | $\frac{\pi}{2}-\theta'$ |
| P3 | 90~135 | 0 | 0 | 1 | $\frac{\pi}{2}+\theta'$ |
| P4 | 135~180 | 0 | 0 | 0 | $\pi-\theta'$ |
| P5 | 180~225 | 1 | 0 | 0 | $\pi+\theta'$ |
| P6 | 225~270 | 1 | 0 | 1 | $\frac{3}{2}\pi-\theta'$ |
| P7 | 270~315 | 1 | 1 | 1 | $\frac{3}{2}\pi+\theta'$ |
| P8 | 315~360 | 1 | 1 | 0 | $-\theta'$ | though # PHASE DETECTION DEVICE AND POSITION DETECTION DEVICE

TECHNICAL FIELD

The present invention relates to a phase detection device detecting phases of a sine wave signal and a cosine wave signal having phases in accordance with the position of a measured object and a position detection device having the phase detection device.

BACKGROUND ART

Various position detection devices detecting the position of the measured object by generating a sine wave (sin θ) signal having a phase (θ) in accordance with the position of the measured object and a cosine wave (cos θ) signal (=another sine wave signal deviated in phase by π/2 relative to the sine wave signal) and detecting phases of those signals are known. For example, a position detection device having an encoder and a position detection device having an amplitude modulation type resolver are known.

Patent Literature 1 discloses the art of calculating a tangent (y=tan θ) from a sine wave signal and a cosine wave signal output from an amplitude modulation type resolver and calculating an arc tangent (θ=tan$^{-1}$ y) of that tangent to thereby calculate the phase θ.

Patent Document 1: Japanese Patent Publication (A) No. 9-257410

DISCLOSURE OF THE INVENTION

Problem to be Solved by the Invention

For the calculation of the arctangent, for example, a method of holding data linking the tangent and the arctangent to thereby specify the arctangent corresponding to a tangent may be considered. In this case, however, a large volume of data must be held. Further, calculation of an arctangent by an operation equation can be considered as well. In this case, however, when trying to calculate it with a good precision, the amount of computation become enormous and the circuit etc. are complicated as well.

Accordingly, preferably a phase detection device capable of detecting a phase by a simple configuration and a position detection device having the phase detection device are provided.

Means for Solving the Problem

A phase detection device of the present invention is a phase detection device detecting a phase in accordance with a position of a measured object based on a sine wave signal and a cosine wave signal having the phase, having a sine wave sign judgment part judging a sign of the sine wave signal, a cosine wave sign judgment part judging a sign of the cosine wave signal, a magnitude judgment part judging a magnitude relationship between an absolute value of the sine wave signal and an absolute value of the cosine wave signal, a section specifying part configured to specify which of eight sections obtained by dividing a range from 0 to 2π for each π/4 from 0 contains the phase based on the judgment results of the sine wave sign judgment part, the cosine wave sign judgment part, and the magnitude judgment part, an arctangent calculation part configured to adjust signs of the sine wave signal and the cosine wave signal and make one of the cosine wave signal and the cosine wave signal a sine wave and make the other a cosine wave so that a combination of the sign of the sine wave, the sign of the cosine wave, and the magnitude relationship between the absolute value of the sine wave and the absolute value of the cosine wave becomes constant regardless of which of the eight sections contains the phase, and calculate the arctangent of the tangent based on the sine wave and cosine wave according to a procedure common to the eight sections, and a phase calculation part configured to calculate the phase based on the range of the section specified by the section specifying part and the arctangent calculated by the arctangent calculation part.

Preferably, the arctangent calculation part is configured to calculate a value obtained by dividing a smaller value between the absolute value of the sine wave signal and the absolute value of the cosine wave signal by a larger value as the tangent or arctangent.

Preferably, the arctangent calculation part holds data linking the tangent and a correction value comprised by a difference between the tangent and the arctangent, specifies the corresponding correction value from among the data using the value obtained by dividing the smaller value between the absolute value of the sine wave signal and the absolute value of the cosine wave signal by the larger value as the tangent, and adds that specified correction value to the divided value to calculate the arctangent.

Preferably, the device has a counter counting a number of cycles of the sine wave signal and the cosine wave signal by incrementing the count when the phase sequentially calculated by the phase calculation part exceeds a predetermined reference phase in one direction and decrementing the count when the phase exceeds the reference phase in the other direction and an output part outputting the number of cycles counted by the counter and the phase calculated by the phase calculation part in accordance with an input of a predetermined read signal.

Preferably, the device has a sine wave A/D converter generating a digital type sine wave signal having $n_2-2$ bits of information showing a signal level of the sine wave signal and a cosine wave A/D converter generating a digital type cosine wave signal having $n_2-2$ bits of information showing the signal level of the cosine wave signal, wherein the arctangent calculation part is configured to generate a digital type phase signal having $n_2$ bits of information showing the phase based on the digital type sine wave signal and the digital type cosine wave signal, the counter is configured to generate a digital type cycle number signal having $n_1$ bits of information showing the number of cycles based on the phase signal, and the output part is configured to simultaneously output, to $n_1+n_2$ lines, digital type detection signals of $n_1+n_2$ bits of information comprised of the $n_1$ bits of information showing the number of cycles and the $n_2$ bits of information showing the phase.

A position detection device of the present invention has a detector outputting a sine wave signal and a cosine wave signal having a phase in accordance with a position of a measured object, a phase detection device detecting the phase based on the sine wave signal and the cosine wave signal output from the detector, and a position calculation device calculating the position of the measured object based on the phase detected by the phase detection device, wherein the phase detection device has a sine wave sign judgment part judging a sign of the sine wave signal, a cosine wave sign judgment part judging a sign of the cosine wave signal, a magnitude judgment part judging a magnitude relationship between an absolute value of the sine wave signal and an absolute value of the cosine wave signal, a section specifying part configured to specify which of eight sections obtained by dividing a range from 0 to $2\pi$ for each $\pi/4$ from 0 contains the phase based on the judgment results of the sine wave sign judgment part, the cosine wave sign judgment part, and the magnitude judgment part, an arctangent calculation part configured to adjust signs of the sine wave signal and the cosine wave signal and make one of the cosine wave signal and the cosine wave signal a sine wave and make the other a cosine wave so that a combination of the sign of the sine wave, the sign of the cosine wave, and the magnitude relationship between the absolute value of the sine wave and the absolute value of the cosine wave becomes constant regardless of which of the eight sections contains the phase, and calculate the arctangent of the tangent based on the sine wave and cosine wave according to a procedure common to the eight sections, and a phase calculation part configured to calculate the phase based on the range of the section specified by the section specifying part and the arctangent calculated by the arctangent calculation part.

Effect of the Invention

According to the present invention, a phase can be detected by a simple configuration.

BRIEF DESCRIPTION OF THE DRAWINGS

FIG. 3 A table showing characteristics of sections obtained by dividing a range from 0 to $2\pi$ to eight.

EXPLANATION OF NOTATIONS

1 . . . phase detection device, 21S . . . sine wave sign judgment part, 21C . . . cosine wave sign judgment part, 23 . . . magnitude judgment part, 27 . . . section specifying part, 37 . . . arctangent calculation part, 35 . . . phase calculation part, Obj . . . measured object, Ssa . . . sine wave signal, and Sca . . . cosine wave signal.

BEST MODE FOR CARRYING OUT THE INVENTION

Figure 1:
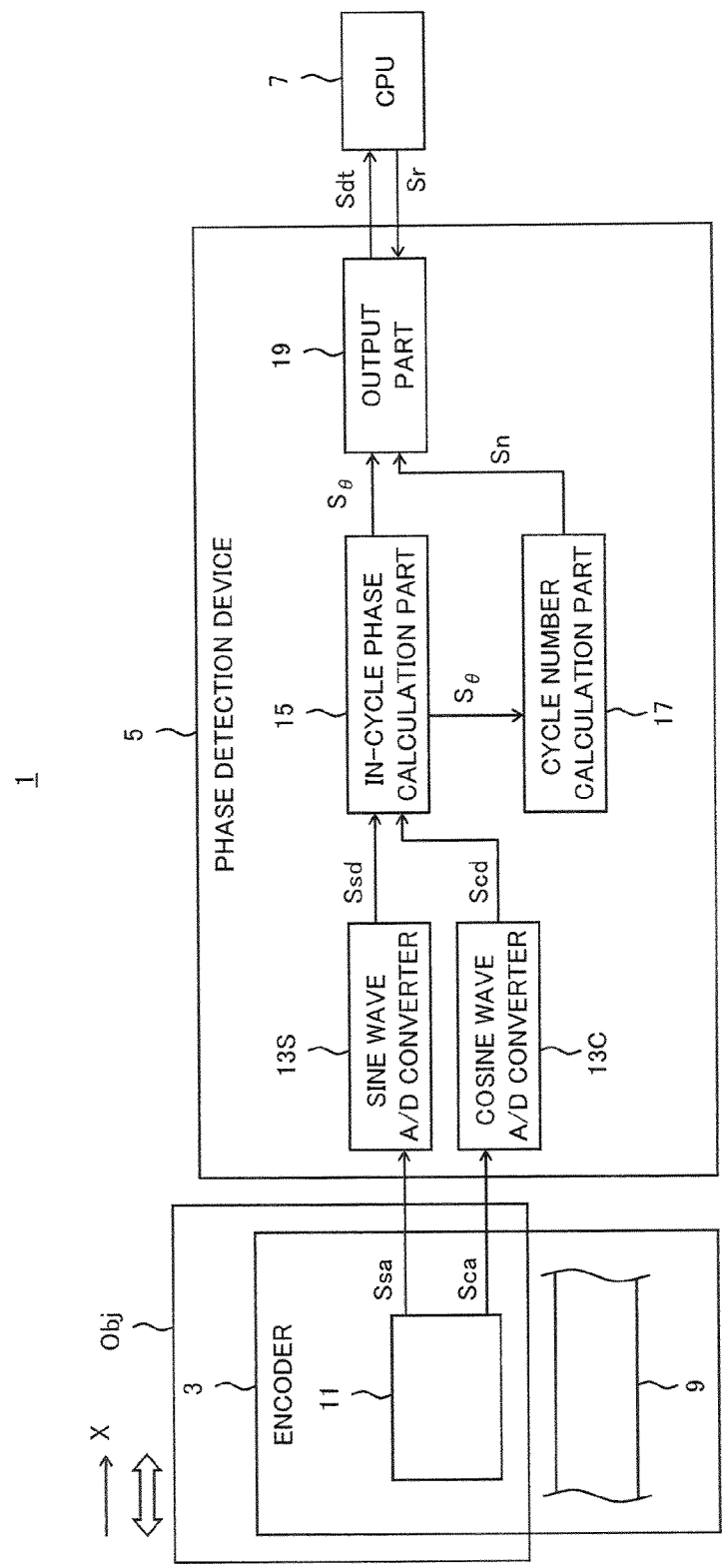
FIG. 1 A block diagram schematically showing an overall configuration of a position detection device according to an embodiment of the present invention.

FIG. 1 is a block diagram schematically showing an overall configuration of a position detection device 1 according to an embodiment of the present invention. The position detection device 1 is configured as a device detecting a position x in an X-axis direction of a measured object Obj.

The position detection device 1 has an encoder 3 as the detector outputting a sine wave signal Ssa and a cosine wave signal Sca having a phase $\theta$ in accordance with the position x of the measured object Obj, a phase detection device 5 calculating the phase $\theta$ of the sine wave signal Ssa and the cosine wave signal Sca output from the encoder 3, and a CPU 7 reading the phase calculated by the phase detection device 5.

The encoder 3 is configured by for example a so-called linear encoder. The encoder 3 has a detected part 9 and a detection part 11 capable of relative movement with respect to the detected part 9. The detection part 11 outputs the sine wave signal Ssa and the cosine wave signal Sca having a phase $\theta$ in accordance with the position relative to the detected part 9. One of the detected part 9 and detection part 11 is fixed with respect to the measured object Obj. FIG. 1 exemplifies a case where the detection part 11 is fixed with respect to the measured object Obj.

When the encoder 3 is configured by, for example, a magnetic type linear encoder, in the detected part 9, an N pole and an S pole are alternately aligned along the X-axis direction. The detection part 11 includes, for example, an MR element or a Hall IC, detects a magnetic field of the detected part 9, and outputs an electric signal. When the position in the X-axis direction of the detection part 11 relative to the detected part 9 changes, the position relationship with respect to the N pole and the S pole changes, and the signal level of the electric signal output by the detection part 11 changes as well. Due to this, a sine wave signal Ssa and the cosine wave signal Sca having the phase $\theta$ in accordance with the position are output.

Further, for example, when it is configured by an optical type linear encoder, the lattice is arranged along the X-axis direction in the detected part 9. The detection part 11 includes a detection part side scale in which the lattice is arranged along the X-axis direction and a light receiving element receiving the light transmitted through the lattice of the detected part 9 and lattice of the detection part side scale. When the position in the X-axis direction of the detection part 11 relative to the detected part 9 changes, the light receiving amount of the light receiving element changes, and the signal level of the electric signal output by the detection part 11 changes as well. Due to this, a sine wave signal Ssa and cosine wave signal Sca having a phase $\theta$ in accordance with the position are output.

The sine wave signal Ssa is an analog signal where the signal level is represented by $V_0 \times \sin\theta$ or $-V_0 \times \sin\theta$ when the voltage which becomes the reference (not limited to so-called reference potential) is assumed to be 0. Below, an explanation will be given assuming that the sine wave signal Ssa is represented by $V_0 \times \sin\theta$.

The cosine wave signal Sca is an analog signal where the signal level is represented by $V_0 \times \cos\theta$ or $-V_0 \times \cos\theta$ when the voltage which becomes the reference (not limited to so-called reference potential) is assumed to be 0 and. Below, an explanation will be given assuming that the cosine wave signal Sca is represented by $-V_0 \times \cos\theta$.

The phase $\theta$ is, for example, proportional to the position x. The $V_0$ is, for example, a constant voltage with respect to the voltage which becomes the reference in a case where the detector is configured by an encoder as in the present embodiment. Further, for example, when the detector is configured by an amplitude modulation type resolver, it fluctuates by a cycle of an excitation signal input to the resolver.

In the present application, the signs and absolute values of the sine wave $\sin\theta$ (or $-\sin\theta$) and cosine wave $-\cos\theta$ (or $\cos\theta$) indicated by the sine wave signal Ssa and the cosine wave signal Sca are sometimes abbreviated as the signs and absolute values of the sine wave signal Ssa and the cosine wave signal Sca. Further, an explanation will be sometimes given of the sine wave signal Ssa and the cosine wave signal Sca while appropriately omitting $V_0$.

Note that, the cosine wave signal Sca is a signal deviated from the sine wave signal Ssa by exactly $\pi/2$ in phase, therefore it can be considered that the encoder 3 outputs two sine wave signals which are deviated in phase by exactly $\pi/2$ or can be considered that the encoder 3 outputs two cosine wave signals deviated in phase by exactly $\pi/2$.

The phase detection device 5 has a sine wave A/D converter 13S converting the sine wave signal Ssa from the encoder 3 from analog to digital and outputting a digital type sine wave signal Ssd and a cosine wave A/D converter 13C converting the cosine wave signal Sca from the encoder 3 from analog to digital and outputting a digital type cosine wave signal Scd (hereinafter, these will be sometimes simply referred to as the "A/D converter 13" and not differentiated).

Note that, below, the analog type sine wave signal Ssa and the digital type sine wave signal Ssd will be sometimes simply referred to as the "sine wave signal Ss" and not differentiated, and the analog type cosine wave signal Sca and the digital type cosine wave signal Scd will be sometimes simply referred to as the "cosine wave signal Sc" and not differentiated The digital type sine wave signal Ssd and cosine wave signal Scd contain, for example, information concerning signal levels of the analog type sine wave signal Ssa and cosine wave signal Sca as information of a predetermined number of bits (for example, 8 bits). The digital type sine wave signal Ssd and cosine wave signal Scd are, for example, binary digital signals. Signal levels of the sine wave signal Ssd and cosine wave signal Scd are represented by binary numbers. Note that, the digital type sine wave signal Ssd and cosine wave signal Scd may be multi-value digital signals as well.

Note that, the signal levels (voltages) of the analog type sine wave signal Ssa and cosine wave signal Sca and numerical values indicated by the information contained by the digital type sine wave signal Ssd and cosine wave signal Scd may be appropriately linked. For example, a range from −10 to 10V of the signal level of the analog signal is linked with a range of 8 bits of binary numbers ($-2^{8-1}$ to $2^{8-1}-1$) indicated by digital signals.

The sine wave signal Ss and the cosine wave signal Sc are frequency functions. Therefore, even when phases are equal, the numbers of cycles are sometimes different. Namely, where the number of cycles is n, $V_0 \times \sin\theta = V_0 \times \sin(\theta+2\pi n)$ in the sine wave signal Ssa, and $-V_0 \times \cos\theta = -V_0 \times \cos(\theta+2\pi n)$ in the cosine wave signal Sca. Note that, $\theta+2\pi n$ is the phase as well. Then, even when phases are equal, if the number of cycles n differs, the position x differs.

Therefore, the phase detection device 5 has an in-cycle phase calculation part 15 calculating the phase $\theta$ in the cycle (hereinafter, phase $\theta$: determined to 0 to $2\pi$), a cycle number calculation part 17 calculating the number of cycles n, and an output part 19 outputting the phase $\theta$ calculated by the in-cycle phase calculation part 15 and the number of cycles n calculated by the cycle number calculation part 17.

The in-cycle phase calculation part 15 calculates the phase $\theta$ based on the sine wave signal Ssd and the cosine wave signal Scd from the A/D converter 13 and outputs a digital type phase signal $S_\theta$ containing the information of that phase $\theta$. The cycle number calculation part 17 calculates the number of cycles n based on the phase signal $S_\theta$ and outputs a digital type cycle number signal Sn containing the information of that number of cycles n. The output part 19 outputs a detection signal Sdt containing the information contained by the phase signal $S_\theta$ and the cycle number signal Sn based on these signals.

The CPU 7 outputs a predetermined read signal Sr to the output part 19 at an appropriate timing and requests the output of the detection signal Sdt. The CPU 7 calculates the position x of the measured object Obj based on the phase $\theta$ and number of cycles n contained in the detection signal Sdt. Then, it performs position control of the measured object Obj in the X-axis direction based on the position x, displays the position x on a not shown monitor, or executes other various processing in accordance with the position x. Note that, it may output the detection signal Sdt from the output part 19 to the CPU 7 at an appropriate timing without outputting the read signal Sr from the CPU 7 as well.

Note that, when the position detection device 1 is included in a machine tool or other industrial machine, for example, the phase detection device 5 is included in an interpolator, and the CPU 7 is included in a controller. Note that the phase detection device 5 of the present embodiment calculates the phase by calculating the arctangent as will be explained later, therefore can be reduced in size in comparison with a phase detection device that generates interpolation pulses by using a plurality of resistors and comparators, counts those interpolation pulses, and detects the phase. Also, it is also possible to include the phase detection device 5 in the controller to eliminate the interpolator.

Figure 2:
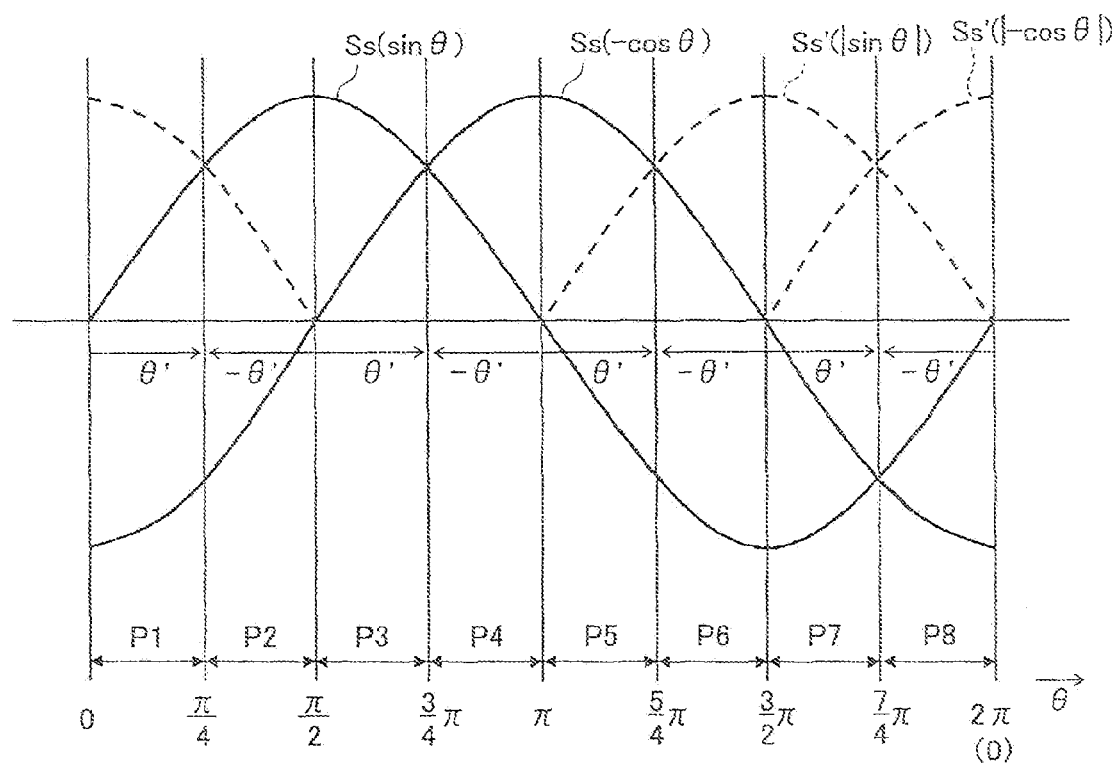
FIG. 2 A diagram explaining a phase calculation method by a phase detection device of the position detection device of FIG. 1.

FIG. 2 is a diagram explaining a phase calculation method by the phase detection device 5. An abscissa of FIG. 2 shows the phase, and an ordinate shows values of the sine wave $\sin\theta$ and the cosine wave $-\cos\theta$ (signal levels of the sine wave signal Ssa and cosine wave signal Sca). Solid lines in FIG. 2 show the sine wave $\sin\theta$ (sine wave signal Ssa) and the cosine wave $-\cos\theta$ (cosine wave signal Sca), and dotted lines (Ss', Sc') show values obtained by converting negative values of the sine wave $\sin\theta$ and cosine wave $-\cos\theta$ to positive.

Eight sections obtained by dividing the range from 0 to $2\pi$ for each $\pi/4$ from 0 will be defined as a first section P1 to an eighth section P8 (hereinafter, these will be sometimes simply referred to as the "section P" and not differentiated). The first section P1 to the eighth section P8 differ from each other in the combination of the sign of the sine wave, the sign of the cosine wave, and the magnitude relationship between the absolute value of the sine wave and the absolute value of the cosine wave (which is larger).

FIG. 3 is a table showing characteristics of the first section P1 to the eighth section P8.

The first column of the table shown in FIG. 3 shows notations of sections. The second column of the table shown in FIG. 3 shows ranges of the sections. The third column of the table shown in FIG. 3 shows the sign of the sine wave. Specifically, 0 is shown when the sine wave $\sin\theta$ is positive, and 1 is shown when it is negative. The fourth column of the table shown in FIG. 3 shows the sign of the cosine wave $-\cos\theta$. Specifically, 0 is shown when the cosine wave is positive, and 1 is shown when it is negative. The fifth column of the table shown in FIG. 3 shows the magnitude relationship between the absolute value of the sine wave and the absolute value of the cosine wave. Specifically, 1 is shown when the absolute value of the sine wave is larger than the absolute value of the cosine wave, and 0 is shown when the former is smaller than the latter. The sixth column of the table shown in FIG. 3 will be explained later.

In FIG. 2, consider to make the sign of the sine wave and sign of the cosine wave match with either the positive or negative sign over the range of $\theta=0$ to $2\pi$. For example, in FIG. 2, as indicated by the dotted lines (Ss', Sc'), consider the sine wave $\sin\theta$ as the absolute value, consider the cosine wave $-\cos\theta$ as the absolute value, and match the sign of the sine wave and sign of the cosine wave with the positive sign.

By doing this, the patterns of the sine wave and cosine wave in the first section P1 to the eighth section P8 become the same as each other except the left and right are reverse and/or the sine wave and the cosine wave are reverse (the magnitude relationships between the absolute value of the sine wave and the absolute value of the cosine wave are reverse).

Accordingly, in one section P ($\theta g$ to $\theta g + \pi/4$), when the signs of the sine wave and the cosine wave are adjusted and the sine wave and the cosine wave are switched with each other according to need so that the sign of the sine wave, the sign of the cosine wave, and the magnitude relationship between the absolute value of the sine wave and the absolute value of the cosine wave coincide regardless of which of the sections P be one section P described before, by the procedure common to the eight sections, an in-section phase $\theta'$ (0 to $\pi/4$) in one section P described before can be calculated from the sine wave $\sin \theta$ and the cosine wave $-\cos \theta$ in one section P described before. Then, if the calculated in-section phase $\theta'$ (0 to $\pi/4$) is converted to a phase $\theta$ ($\theta g$ to $\theta g + \pi/4$) by considering the position etc. of one section P described before, the phase $\theta$ is calculated.

Specifically, for example, consider to make the sign of the sine wave, the sign of the cosine wave, and the magnitude relationship between the absolute value of the sine wave and the absolute value of the cosine wave match with the sine wave $\sin \theta'$ and the cosine wave $\cos \theta'$ (here, not $-\cos \theta$) within the range from 0 to $\pi/4$. When performing this, in odd number sections (first section: $\theta g = 0$, third section: $\theta g = \pi/2$, fifth section: $\theta g = \pi$, and seventh section: $\theta g = \pi \times 3/2$), if the in-section phase $\theta'$ (0 to $\pi/4$) is calculated by a procedure equivalent to the calculation of the phase $\theta'$ based on the sine wave $\sin \theta'$ and the cosine wave $\cos \theta'$ within the range from 0 to $\pi/4$, and the in-section phase $\theta'$ is added to the phase $\theta g$ (offset phase $\theta s$) on a border on the left side in each section, the phase $\theta$ is calculated.

Further, in even number sections (second section: $\theta g = \pi/4$, fourth section: $\theta g = \pi \times 3/4$, sixth section: $\theta g = \pi \times 5/4$, and eighth section: $\theta g = \pi \times 7/4$), if the in-section phase $\theta'$ (0 to $\pi/4$) is calculated by a procedure equivalent to the calculation of the phase $\theta'$ based on the sine wave $\sin \theta'$ and the cosine wave $\cos \theta'$ within the range from 0 to $\pi/4$, and the in-section phase $\theta'$ is subtracted from the phase $\theta g + \pi/4$ (offset phase $\theta s$) on a border on the right side in each section, the phase $\theta$ is calculated.

Note that, when the phase $\theta$ is the phase on the border, the phase $\theta$ may be calculated as the phase of any of the sections P on the right side and the left side of this phase $\theta$ as well.

In the rightmost column (sixth column) of the table shown in FIG. 3, an equation calculating the phase $\theta$ according to the offset phase $\theta s$ and the in-section phase $\theta'$ is shown. Note that, in the eighth section, the offset phase $\theta s = 2\pi = 0$.

In the first section P1 to the eighth section P8, if a larger value between the absolute value of the sine wave $\sin \theta$ and the absolute value of the cosine wave $-\cos \theta$ is determined as the cosine wave, and the smaller value is determined as the sine wave, with respect to the sine wave $\sin \theta'$ and the cosine wave $\cos \theta'$ within the range from 0 to $\pi/4$, the sign of the sine wave, the sign of the cosine wave, and the magnitude relationship between the absolute value of the sine wave and the absolute value of the cosine wave coincide. Then, by a procedure calculating the tangent based on the sine wave $\sin \theta'$ and the cosine wave $\cos \theta'$ within the range from 0 to $\pi/4$ and calculating the arctangent of the tangent, the in-section phase $\theta'$ is calculated.

Figure 4:
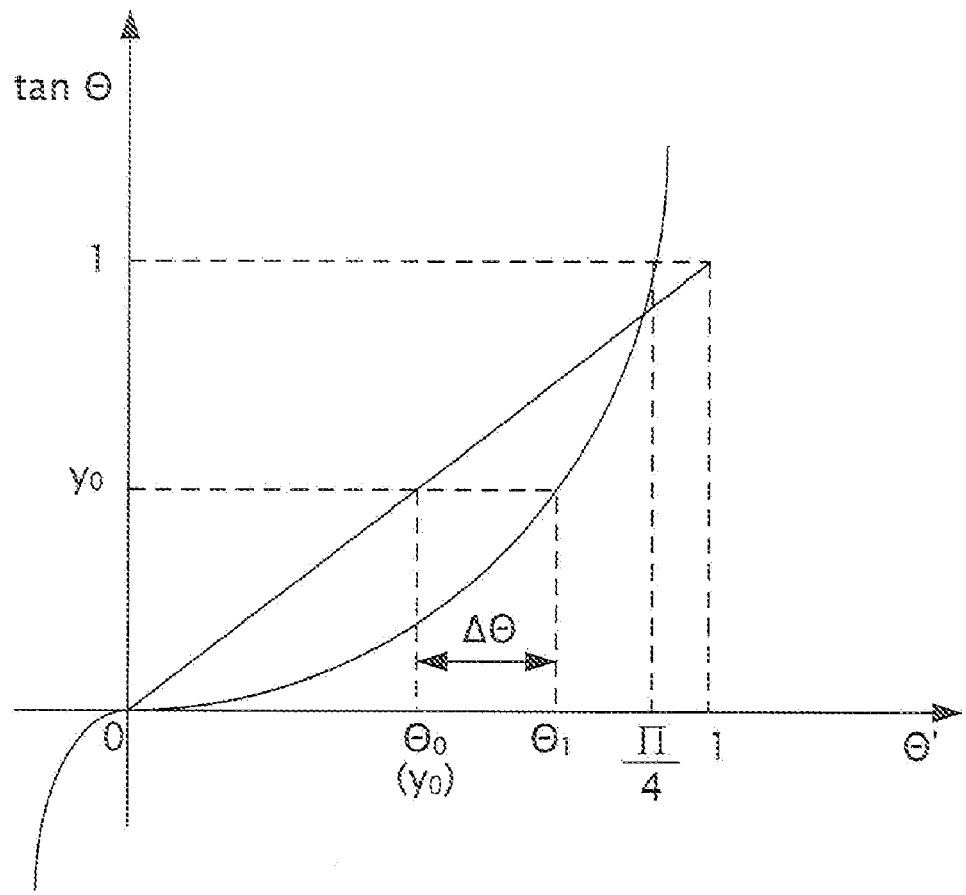
FIG. 4 A diagram explaining a method of calculating the phase from a tangent in a section from 0 to $\pi/4$.

FIG. 4 is a diagram explaining a method of calculating the in-section phase $\theta'$ based on the sine wave $\sin \theta'$ and the cosine wave $\cos \theta'$ within the range from 0 to $\pi/4$.

In the range where $\theta' \ll 1$, $\theta' \cong \tan \theta'$ stands. On the other hand, the range from 0 to $\pi/4$ is the range of $0 < \tan \theta' < 1$. Accordingly, approximately, the tangent $\tan \theta' = \sin \theta' / \cos \theta'$ calculated from the sine wave and the cosine wave can be defined as the phase $\theta'$.

However, with this method, there is error. For example, assuming an approximate arctangent $\theta_0$ is the phase $\theta'$ to the tangent $y_0$, an error of exactly a difference $\Delta \theta$ between the arctangent $\theta_0$ and an actual arctangent $\theta_1$ arises. Therefore, data linking the approximate arctangent $\theta_0$ (=$\tan \theta'$=y=tangent) and the difference $\Delta\theta$ between the approximate arctangent $\theta_0$ and the arctangent $\theta'$ (=$\tan^{-1} y$) and holding the same is prepared, a difference (correction amount) $\Delta \theta$ corresponding to the calculated approximate arctangent $\theta_0$ is specified, and the correction amount $\Delta \theta$ is added to the approximate arctangent $\theta_0$.

Figure 5:
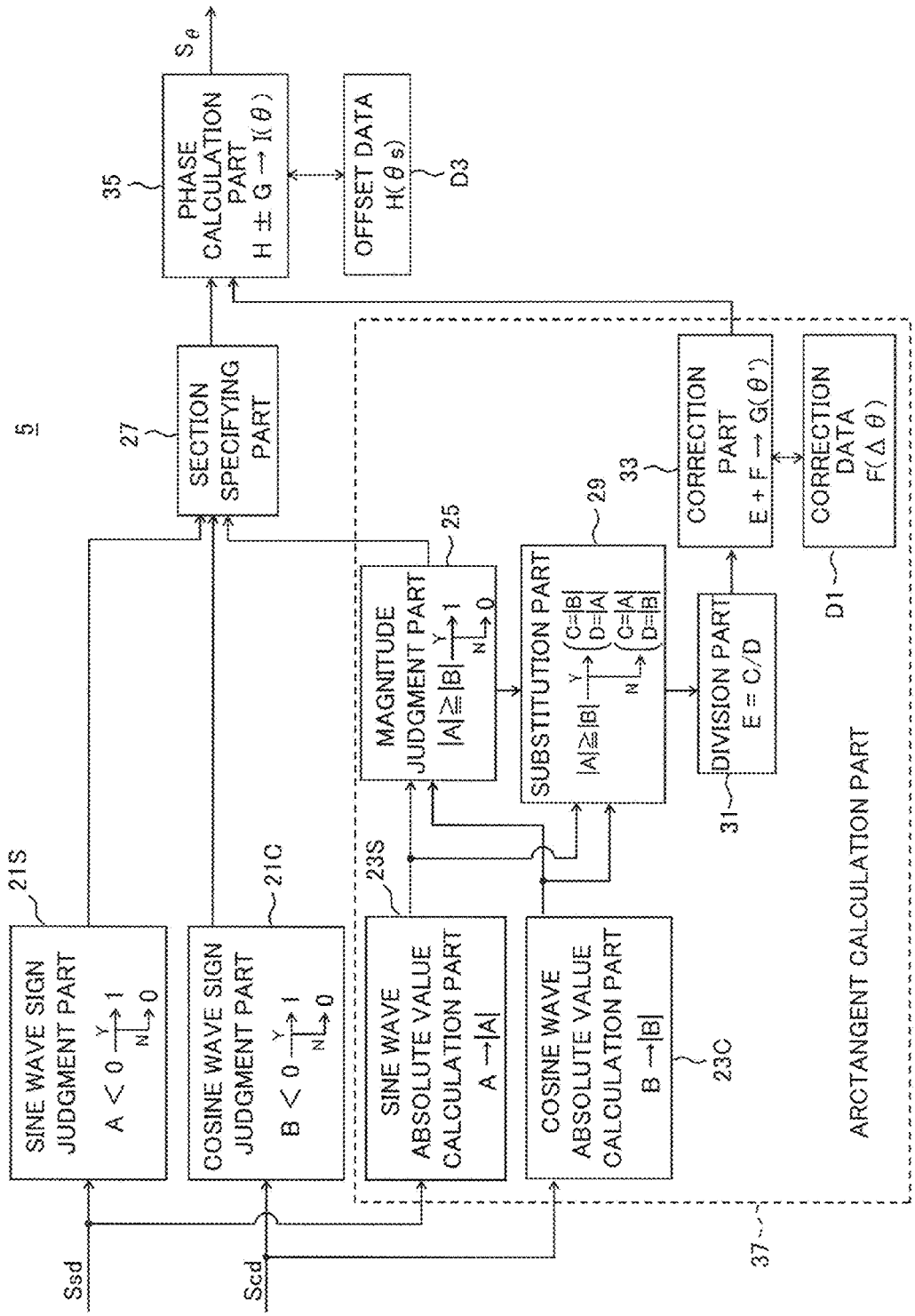
FIG. 5 A block diagram showing the configuration of the phase detection device of the position detection device of FIG. 1.

FIG. 5 is a block diagram showing the configuration of the phase detection device 5 realizing the above method.

The sine wave signal Ssd output from the sine wave A/D converter 13S is input to the sine wave sign judgment part 21S. Further, the cosine wave signal Scd output from the cosine wave A/D converter 13C is input to the cosine wave sign judgment part 21C. Note that, below, the sine wave sign judgment part 21S and the cosine wave sign judgment part 21C sometimes will not be differentiated and will be simply referred to as the "sign judgment part 21".

The sign judgment part 21 differentiates the signs of the numerical values A and B indicated by information of a predetermined number of bits (for example, 8 bits) contained in the digital type sine wave signal Ssd and cosine wave signal Scd. Note that, the numerical values A and B show signal levels of the analog type sine wave signal Ssa and cosine wave signal Sca, and the differentiation of signs of the numerical values A and B is equivalent to the differentiation of signs of signal levels of the analog type sine wave signal Ssa and cosine wave signal Sca. Then, the sign judgment part 21 outputs signals in accordance with the judgment results. The signals output from the sign judgment part 21 are for example binary digital signals. As shown in FIG. 3, when the numerical values A and B are less than 0 (negative), these have signal levels corresponding to true (1), while when these are 0 or more, they have signal levels corresponding to false (0). Note that, the correspondence of the differentiation results of the signs and truth may be vice versa.

Further, the sine wave signal Ssd output from the sine wave A/D converter 13S is input to the sine wave absolute value calculation part 23S, and the cosine wave signal Scd output from the cosine wave A/D converter 13C is input to the cosine wave absolute value calculation part 23C. Note that, below, the sine wave absolute value calculation part 23S and cosine wave absolute value calculation part 23C will be sometimes simply referred to as the "absolute value calculation part 23" without differentiation.

The absolute value calculation part 23 calculates absolute values |A| and |B| of the numerical values A and B indicated by the information contained in the sine wave signal Ssd and the cosine wave signal Scd. Note that, this operation is equivalent to the calculation of absolute values of signal levels of the analog type sine wave signal Ssa and cosine wave signal Sca. Then, the absolute value calculation part 23 outputs signals in accordance with the calculation results. The signals output from the absolute value calculation part 23 are, for example, binary digital signals containing the absolute values |A| and |B| as information of predetermined bits of numerical values (for example, 8 bits).

The magnitude judgment part 25 differentiates the magnitude relationship of the absolute values |A| and |B| calculated by the absolute value calculation part 23. Note that, this operation is equivalent to the differentiation of the magnitude relationship of the absolute values of signal levels of the analog type sine wave signal Ssa and cosine wave signal Sca. Then, the magnitude judgment part 25 outputs signals in accordance with the calculation results. The signals output from the magnitude judgment part 25 are, for example, binary digital signals. As shown in FIG. 3, these have signal levels corresponding to true (1) when |A| is not less than |B|, while have signal levels corresponding to false (0) when |A| is less than |B|. Note that, the correspondence of the judgment result and truth may be vice versa.

The section specifying part 27 specifies which of the first section P1 to the eighth section P8 contains the phase θ of the sine wave signal Ss and the cosine wave signal Sc based on the judgment results of the sign judgment part 21 and the magnitude judgment part 25, that is, the sign of the sine wave signal Ss, the sign of the cosine wave signal Sc, and the magnitude relationship between the absolute value of the sine wave signal Ss and the absolute value of the cosine wave signal Sc. Then, it outputs signals in accordance with the specifying results. The signals output from the section specifying part 27 are, for example, binary digital signals containing information of numerical values of 0 to 7 (numerical values of 3 bits) linked with the first section P1 to the eighth section P8.

An substitution part 29 performs a predetermined substitution operation in order to handle one of the sine wave signal Ss and the cosine wave signal Sc as the sine wave $\sin \theta'$ within the range from 0 to $\pi/4$ and handle the other as the cosine wave $\cos \theta'$ within the range from 0 to $\pi/4$ based on the judgment result of the magnitude judgment part 25, that is, the magnitude relationship between the absolute value of the sine wave signal Ss and the absolute value of the cosine wave signal Sc. For example, C=|B| and D=|A| are determined when the absolute value |A| is the absolute value |B| or more, while C=|A| and D=|B| are determined when the former is less than the latter. C is the value handled as the sine wave $\sin \theta'$, and D is the value handled as the cosine wave $\cos \theta'$.

A division part 31 performs computation of E=C/D. This is equivalent to the computation of tangent (tan θ')=sine wave (sin θ')/cosine wave (cos θ'). Namely, E corresponds to the tangent tan θ', and the division part 31 calculates the tangent. Note that, as explained above, approximation of θ'=tan θ' can be carried out, therefore it is also possible to consider that the division part 31 calculates an approximate arctangent. The numerical value E is calculated as, for example, a numerical value of 7 bits, and the range from 0 to $\pi/4$ of the in-section phase θ' is assigned to 0 to $2^7$. The division part 31 outputs the information of the numerical value E by binary digital signals.

The correction part 33 corrects the numerical value E corresponding to the approximate arctangent calculated by the division part 31 based on the correction data D1 as explained with reference to FIG. 4 and calculates a numerical value G corresponding to the arctangent (in-section phase θ'). Namely, the correction data D1 holds a numerical value (E) of a predetermined number of bits (for example, 7 bits) corresponding to the approximate value of the in-section phase θ' and a numerical value (F) of predetermined number of bits (for example, 4 bits or less) corresponding to the correction value Δθ in correspondence, and the correction part 33 specifies a numerical value F corresponding to a numerical value E calculated by the division part 31 and adds the numerical value F to the numerical value E to thereby calculate the numerical value G corresponding to the in-section phase θ'.

The phase calculation part 35 converts the numerical value G corresponding to the in-section phase θ' calculated by the correction part 33 to a numerical value I corresponding to the phase θ based on the section specified by the section specifying part 27. Specifically, for example, this is as follows. As offset data D3, the information specifying the section P, a numerical value H of a predetermined number of bits (for example, 10 bits) corresponding to an offset phase θs, and information indicating which of addition or subtraction is to be carried out are stored in correspondence. The phase calculation part 35 specifies the numerical value H and the computation (addition or subtraction) corresponding to the section specified by the section specifying part 27 based on the offset data D3. Then, the specified numerical value H is added or subtracted with respect to the numerical value G calculated by the correction part 33 to thereby calculate the numerical value I. This is equivalent to setting the offset phase θs and adding or subtracting the offset phase θs and the in-section phase θ' in accordance with which of sections P is specified, and thereby calculating the phase θ. Then, the phase calculation part 35 outputs a phase signal $S_\theta$ in accordance with that calculated numerical value I. The phase signal $S_\theta$ is, for example, a binary digital signal containing the numerical value I as the information of the numerical value of a predetermined number of bits (for example, 10 bits).

Note that, the absolute value calculation part 23, magnitude judgment part 25, substitution part 29, division part 31, correction part 33, and correction data D1 (storing means holding this) configure the arctangent calculation part 37 calculating the arctangent of the tangent where the signs of the sine wave signal Ssa and cosine wave signal Sca are adjusted and one of the sine wave signal Ssa and the cosine wave signal Sca is made to be a sine wave and the other is made to be a cosine wave so that the combination of the sign of the sine wave, the sign of the cosine wave, and the magnitude relationship between the absolute value of the sine wave and the absolute value of the cosine wave become constant regardless of which of eight sections contains the phase θ.

Figure 6:
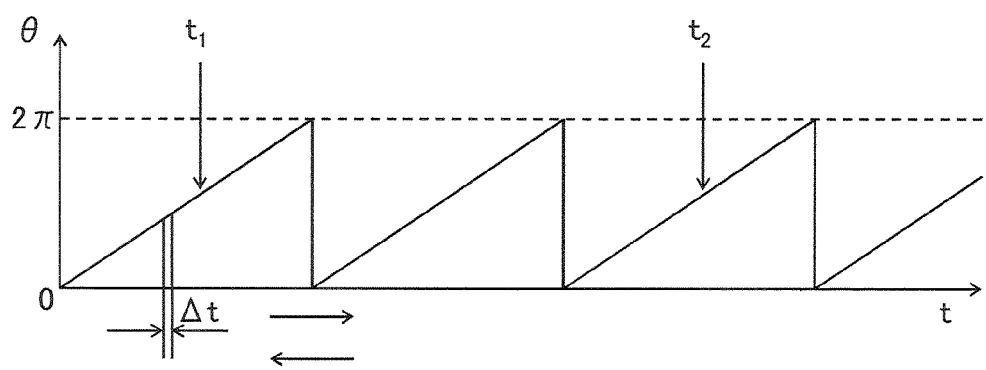
FIG. 6 A diagram explaining the operation of a cycle number calculation part of the position detection device of FIG. 1.

FIG. 6 is a diagram explaining the operation of the cycle number calculation part 17. The abscissa indicates the time t, and the ordinate indicates the phase θ calculated by the in-cycle phase calculation part 15.

The phase θ is calculated at a predetermined time interval Δt by the in-cycle phase calculation part 15. The time interval Δt may be appropriately set. For example, it is 500 ns. Assuming that the position x and the phase θ are proportional, and the measured object Obj moves at a constant velocity toward one in the X-axis direction, as shown in FIG. 6, the phase θ increases with a constant increase ratio. Then, when the phase θ reaches 2π, it returns to 0.

On the other hand, the CPU 7 outputs the read signal Sr to the output part 19 not periodically according to need or periodically by a predetermined cycle (for example, 50 μs) and acquires a detection signal Sdt containing the information of the phase θ. Accordingly, for example, assuming that the CPU 7 acquires the phase θ calculated by the in-cycle phase calculation part 15 at a time t1 and a time t2 as shown in FIG. 6, the time interval from the time t1 to the time t2 is longer than the time by which the phase θ changes by 1 cycle (2π), and the CPU 7 cannot specify the position x uniquely determined according to θ+2πn. Note that, FIG. 6 exemplifies a case where the phase θ increases along with the elapse of time. However, this is true also for a case where the phase θ decreases along with the elapse of time.

Therefore, the phase detection device 5 outputting the detection signal Sdt to the CPU 7 has the cycle number calculation part 17 counting the number of cycles n. Specifically, the cycle number calculation part 17 acquires the phase θ calculated by the in-cycle phase calculation part 15 at each time interval Δt and judges whether or not the phase θ exceeds the reference phase 0 (2π) during the time interval Δt. Namely, it judges if the phase θ changes from 2π to 0 and the phase θ changes from 0 to 2π during the time interval Δt. When judging that the phase θ changes from 2π to 0, it increments the number of cycles n by 1, while when judging that the phase θ changes from 0 to 2π, it decrements the number of cycles n.

Note that, the number of cycles n may be decremented by 1 when judging that the phase θ changes from 0 to 2π, while the number of cycles n may be incremented by 1 when judging that the phase θ changes from 2π to 0 as well. An initial value of the number of cycles n is set according to an appropriate method at the time of activation etc. of the position detection device 1. For example, a user may appropriately input it, the position detection device 1 may appropriately set it by calibration, or the position detection device 1 may set the number of cycles n stored at the time of suspension of the previous activation to the initial value.

Figure 7:
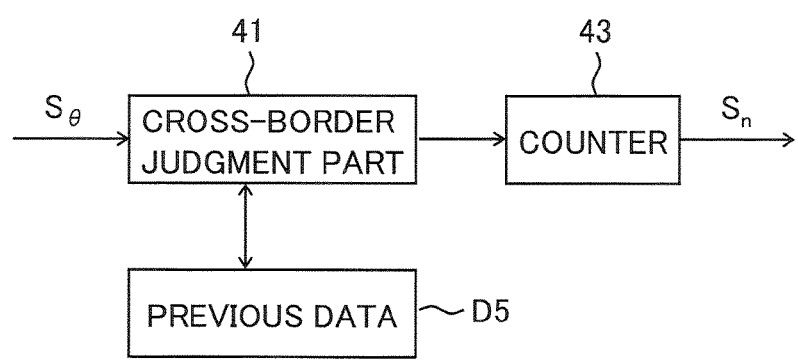
FIG. 7 A block diagram showing the configuration of the cycle number calculation part of the position detection device of FIG. 1.

FIG. 7 is a block diagram showing the configuration of the cycle number calculation part 17 realizing the above operation.

The cycle number calculation part 17 has a cross-border judgment part 41 judging whether or not the phase θ exceeds the reference phase 0 (2π) and a counter 43 counting the number of cycles n based on the judgment result of the cross-border judgment part 41.

To the cross-border judgment part 41, the phase signal $S_\theta$ from the in-cycle phase calculation part 15 is input for each time interval Δt. In the previous data D5, the phase θ indicated by the information contained in the phase signal $S_\theta$ input to the cross-border judgment part 41 the previous time is held. When the phase signal $S_\theta$ is input, the cross-border judgment part 41 compares the phase θ indicated by the information contained in the phase signal $S_\theta$ and the phase θ held in the previous data D5 and judges whether or not the phase θ exceeds the reference phase 0. Then, it outputs the signal in accordance with the judgment result to the counter 43 and updates the phase θ held in the previous data D5 by the phase θ indicated by the information contained in this time input phase signal $S_\theta$.

The cross-border judgment part 41, for example, judges whether or not the phase θ exceeds the reference phase 0 based on the change of the numerical value I explained with reference to FIG. 5. For example, assuming that the numerical value I is represented by a 10-bit binary number and 0 to 2π correspond to 0000000000 to 1111111111, the cross-border judgment part 41 judges whether or not the numerical value I changes from 0000000000 to 1111111111 and changes from 1111111111 to 0000000000.

The cross-border judgment part 41 outputs the judgment result, for example, by a binary digital signal containing 1 bit of information. Namely, when the phase θ exceeds the reference phase from 2π to 0, it outputs the signal at the signal level of true (1), while when the phase θ exceeds the reference phase from 2π to 0, it outputs the signal at the signal level of false (0). Note that, the correspondence of the direction of exceeding the reference phase and truth may be vice versa. Further, three types of judgment results of a case where the phase θ does not exceed the reference phase, a case where the phase θ exceeds the reference phase from 2π to 0, and a case where the phase θ exceeds the reference phase from 2π to 0 may be contained in 2 bits of information and output by binary digital signals as well. The time interval at which the cross-border judgment part 41 acquires the phase θ and makes its judgment may be different from the time interval at which the in-cycle phase calculation part 15 calculates the phase θ as well.

The counter 43 is configured by, for example, a counter capable of setting the initial value and capable of switching increment or decrement. The counter 43 is set in the initial value according to an appropriate method as explained above. Then, when the signal indicating that the phase θ exceeds the reference phase from 2π to 0 is input from the cross-border judgment part 41, it increments the count, while when the signal indicating that the phase θ exceeds the reference phase from 0 to 2π is input, it decrements the count. Note that, the correspondence of the direction in which the phase θ exceeds the reference phase and increment or decrement may be vice versa.

The counter 43 outputs the cycle number signal Sn containing the information of the number of cycles n. The cycle number signal Sn is, for example, a binary digital signal containing the number of cycles n as 6 bits of information.

Figure 8A:
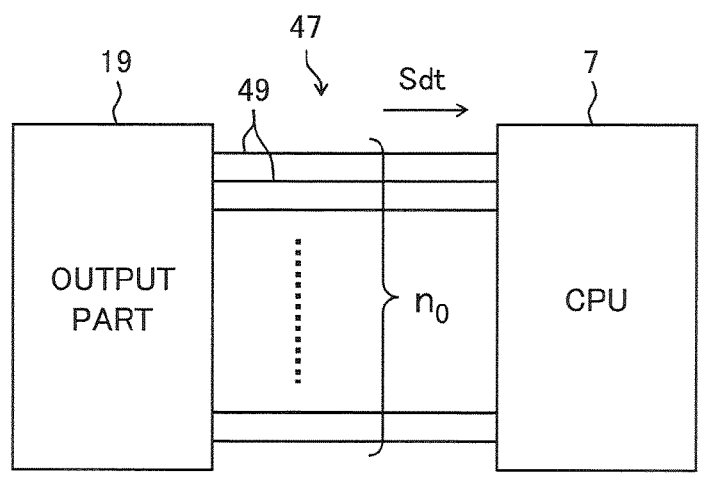
FIGS. 8A and 8B Diagrams explaining an output method of a detection signal from an output part to a CPU in the position detection device of FIG. 1.
Figure 8B:
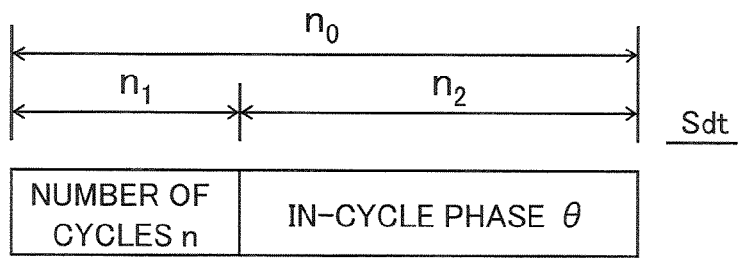

FIGS. 8A and 8B are diagrams explaining an output method of the detection signal Sdt from the output part 19 to the CPU 7. FIG. 8A is a diagram conceptually showing connection of the output part 19 and the CPU 7, and FIG. 8B is a diagram conceptually showing information contained in the detection signal Sdt.

As shown in FIG. 8A, the output part 19 and the CPU 7 are connected by a bus line 47. The CPU 7 is configured by a CPU of $n_0$ bits. $n_0$ may be appropriately selected as 8, 16, 32, or the like, but for example is 16. Further, the bus line 47 has $n_0$ lines 49.

On the other hand, as shown in FIG. 8B, the detection signal Sdt contains information of $n_0$ bits containing information of $n_1$ bits indicating the number of cycles n and information of $n_2$ bits indicating the in-cycle phase θ. Note that, $n_0=n_1+n_2$. $n_1$ and $n_2$ may be appropriately set. However, for example, where $n_0$ is 16, $n_1$ is 6 and $n_2$ is 10.

Accordingly, when the detection signal Sdt containing the information indicating the number of cycles n and the information indicating the phase θ is output from the output part 19 to the CPU 7, the information of each bit of the information of $n_0$ bits of the detection signal Sdt is assigned to each of $n_0$ lines 49 of the bus line 47 and is simultaneously output from the output part 19 to the CPU 7.

The phase θ is the information of $n_2$ bits (for example, 10 bits), therefore the phase of the section P (for example, 0 to π/4) obtained by dividing the range (0 to 2π) of the phase θ to eight is the information of ($n_2-3$) bits (for example, 7 bits) ($2^{10}/8=2^7$). Here, the digital type sine wave signal Ssd and cosine wave signal Scd, for example, hold signal levels of the analog type sine wave signal Ssa and cosine wave signal Sca as the information of ($n_2-2$) bits (for example, 8 bits). The signal levels of the analog type sine wave signal Ssa and cosine wave signal Sca are the sign, therefore the absolute values are represented as the information of ($n_2-3$) bits (for example, 7 bits). Accordingly, the division number of θ in one section P and the division number of the absolute values of the sine wave signal Ss and cosine wave signal Sc coincide. As a result, there is no waste in the resolution of the signal levels of the sine wave signal Ssa and cosine wave signal Sca and the resolution of phases.

Note that, the bit number (division number of 0 to 2π) $n_2$ of the phase θ is determined based on, for example, the precision required in the control of the position x of the measured object Obj. For example, in order to control the position x of the measured object Obj within a range of an error Δx, the position detection device 1 must be able to detect the change of Δx in the position x of the measured object Obj. Accordingly, the bit number $n_2$ of the phase $\theta$ is set so that $2\pi/n_2$ becomes not more than the amount of fluctuation of the phase $\theta$ in accordance with the change of $\Delta x$ of the position x.

According to the above embodiment, the device has the section specifying part 27 specifying which of the first section P1 to the eighth section P8 contains the phase $\theta$ based on the sign of the sine wave signal Ssa, the sign of the cosine wave signal Sca, and the magnitude relationship between the absolute value of the sine wave signal Ssa and the absolute value of the cosine wave signal Sca, the arctangent calculation part 37 calculating the arctangent ($\theta'=\tan^{-1} y$) of the tangent ($y=\tan \theta'$) when adjusting the signs of the sine wave signal Ssa and the cosine wave signal Sca and making one of the sine wave signal Ssa and the cosine wave signal Sca a sine wave and making the other a cosine wave so that the sign of the sine wave, the sign of the cosine wave, and the magnitude relationship between the absolute value of the sine wave and the absolute value of the cosine wave coincide regardless of which of the sections P contains the phase $\theta$, and the phase calculation part 35 calculating the phase $\theta$ ($=\theta s+\theta'$ or $\theta s-\theta'$) based on the range of the section P specified by the section specifying part 27 (specified according to the offset phase $\theta s$) and the arctangent calculated by the arctangent calculation part 37 ($\theta'=\tan^{-1} y$), therefore the arctangent can be calculated according to a procedure common to the eight sections. As a result, simplification and smaller size of the phase detection device 5 are achieved. For example, where the arctangent is specified from the tangent based on the data linking the tangent and the arctangent, the amount of data becomes ⅛.

The arctangent calculation part 37 calculates a value obtained by dividing a smaller value between the absolute value of the sine wave signal Ssa and the absolute value of the cosine wave signal Sca by the larger value as the tangent or arctangent, therefore can calculate the arctangent within the range where the tangent ($\tan \theta'$) becomes 0 to 1 (the range where the phase is 0 to $\pi/4$), so a load of the arctangent calculation part 37 can be lightened and reduced. Namely, the tangent ($\tan \theta$) is a function having a value within a range from 0 to $\infty$. For example, when the phase is $\pi/4$ to $\pi/2$, a large number of bits is required in order to hold the value of the tangent, and the amount of computation is large as well. However, the computation is carried out within a range where the tangent is 0 to 1, therefore a large number of bits is not required in order to hold the value of the tangent, and the amount of computation is small as well. Further, within the range from 0 to $\pi/4$, the tangent is the approximate value of the arctangent, therefore it is possible to use the tangent as the arctangent.

The arctangent calculation part 37 holds correction data D1 linking the tangent $y=\tan \theta'$ ($=$approximate arctangent) and the correction value $\Delta\theta$ comprised by a difference between the tangent $\tan \theta'$ and the arctangent $\theta'=\tan^{-1} y$, specifies the correction value $\Delta\theta$ corresponding to the calculated $\tan \theta'$ from the correction data D1, adds that specified correction value $\Delta\theta$ to $\tan \theta'$, and thereby calculates the arctangent $\tan^{-1} y$. As explained above, within the range from 0 to $\pi/4$, the difference between $\tan \theta'$ and $\theta'$ is small, therefore the number of bits of the held correction value $\Delta\theta$ may be small.

The phase detection device 5 has the counter 43 incrementing the count when the phase $\theta$ sequentially calculated by the in-cycle phase calculation part 15 exceeds the reference phase 0 ($2\pi$) in one direction and decrementing the count when the phase $\theta$ exceeds the reference phase 0 in the other direction and the output part 19 outputting the count number n counted by the counter 43 and the phase $\theta$ calculated by the in-cycle phase calculation part 15 in response to the input of the read signal Sr from the CPU 7. Therefore, even when the time interval of the read signal Sr is longer than the time of 1 cycle, CPU 7 can specify the position x indicated by $\theta+2\pi n$.

The A/D converter 13 generates the sine wave signal Ssd and the cosine wave signal Scd as digital signals having information of $n_2-2$ bits (for example, 8 bits) indicating the signal levels of the analog type sine wave signal Ssa and cosine wave signal Sca, the arctangent calculation part 37 generates the phase signal Se having information of $n_2$ bits (for example, 10 bits) indicating the phase $\theta$ based on the sine wave signal Ssd and the cosine wave signal Scd, the counter 43 of the cycle number calculation part 17 generates the cycle number signal Sn having information of $n_1$ bits (for example, 6 bits) indicating the count value n based on the phase signal $S_\theta$, and the output part 19 simultaneously outputs the digital signals of information of $n_1+n_2$ bits (for example, 16 bits) comprised by information of $n_1$ bits indicating the count value n and information of $n_2$ bits indicating the phase $\theta$ to $n_1+n_2$ (for example, 16) lines 49 based on the phase signal $S_\theta$ and the cycle number signal Sn, therefore there is no waste in the resolution of the signal levels of the sine wave signal Ssa and cosine wave signal Sca and the resolution of phases, and simultaneous output from the bus line 47 is possible, thereby the phase $\theta$ can be efficiently detected.

The present invention is not limited to the above embodiment and may be worked in various ways.

The measured object is not limited to one linearly moving. It may be one rotating as well. Further, the detector outputting the sine wave signal and cosine wave signal having phases in accordance with the position of the measured object is not limited to ones detecting the position in the axial direction such as a linear encoder, but may be one detecting the position in a rotation direction such as a rotary encoder and a resolver as well.

Note that, the detector detecting the position in the rotation direction may be one where 1 cycle of the sine wave signal and cosine wave signal output from the detector corresponds to one rotation of the measured object, may be one where a plurality of cycles of the sine wave signal and cosine wave signal output from the detector correspond to one rotation of the measured object, or may be one where 1 cycle of the sine wave signal and cosine wave signal output from the detector corresponds to several rotations of the measured object.

The cycle number calculation part is not an indispensable requirement of the present invention. For example, it is not necessary to calculate the number of cycles so far as the movement range of the measured object corresponds to the range in 1 cycle of the sine wave signal and cosine wave signal.

The procedure common to eight sections for calculating the arctangent is not limited to the method of calculating the arctangent based on $\sin \theta$ and $\cos \theta$ within the range from 0 to $\pi/4$. Note, by utilizing the calculation procedure of the phase in 0 to $\pi/4$, various effects are obtained as explained above.

In the embodiment, the tangent calculated by converting the sine wave and cosine wave of each section to the sine wave and cosine wave within the range from 0 to $\pi/4$ was not used as the arctangent as it was, but corrected. However, where a high precision is not required, the calculated tangent may be utilized as the arctangent as it is as well.

The reference phase which becomes the reference when counting the number of cycles is not limited to 0 ($2\pi$), but may be an appropriate value. Note, if 0 ($2\pi$), the computation is easy.

The digital type sine wave signal, cosine wave signal, phase signal, cycle number signal, and detection signal may have information of appropriate bit numbers and are not limited to those exemplified in the embodiment.

The invention claimed is:

1. A phase detection device detecting a phase in accordance with a position of a measured object based on a sine wave signal and a cosine wave signal having the phase, comprising:
a sine wave sign judgment part configured to judge a sign of the sine wave signal;
a cosine wave sign judgment part configured to judge a sign of the cosine wave signal;
a magnitude judgment part configured to judge a magnitude relationship between an absolute value of the sine wave signal and an absolute value of the cosine wave signal;
a section specifying part configured to specify which of eight sections obtained by dividing a range from 0 to $2\pi$ for each $\pi/4$ from 0 contains the phase based on the judgment results of the sine wave sign judgment part, the cosine wave sign judgment part, and the magnitude judgment part;
an arctangent calculation part configured to adjust signs of the sine wave signal and the cosine wave signal and make one of the sine wave signal and the cosine wave signal a sine wave and make the other a cosine wave so that a combination of the sign of the sine wave, the sign of the cosine wave, and the magnitude relationship between the absolute value of the sine wave and the absolute value of the cosine wave becomes constant regardless of which of the eight sections contains the phase, and calculate an approximate arctangent of the tangent based on the sine wave and cosine wave according to a procedure common to the eight sections, by holding data linking a tangent and a correction value comprised by a difference between the tangent and an arctangent, specifying the corresponding correction value from among the data using the value obtained by dividing a smaller value between the absolute value of the sine wave signal and the absolute value of the cosine wave signal by a larger value between the absolute value of the sine wave signal and the absolute value of the cosine wave as the tangent, and adding the specified correction value to the divided value to calculate the approximate arctangent; and
a phase calculation part configured to calculate the phase based on the range of the section specified by the section specifying part and the approximate arctangent calculated by the arctangent calculation part.

2. A phase detection device as set forth in claim 1, comprising:
a counter configured to count a number of cycles of the sine wave signal and the cosine wave signal by incrementing the count when the phase sequentially calculated by the phase calculation part exceeds a predetermined reference phase in one direction; and decrementing the count when the phase exceeds the reference phase in the other direction and
an output part configured to output the number of cycles counted by the counter and the phase calculated by the phase calculation part in accordance with an input of a predetermined read signal.

3. A phase detection device as set forth in claim 2, comprising:
a sine wave A/D converter configured to generate a digital type sine wave signal having $n_2-2$ bits of information showing a signal level of the sine wave signal; and
a cosine wave A/D converter configured to generate a digital type cosine wave signal having $n_2-2$ bits of information showing the signal level of the cosine wave signal; wherein the arctangent calculation part is configured to generate a digital type phase signal having $n_2$ bits of information showing the phase based on the digital type sine wave signal and the digital type cosine wave signal;
the counter is configured to generate a digital type cycle number signal having $n_1$ bits of information showing the number of cycles based on the phase signal; and
the output part is configured to simultaneously output, to $n_1+n_2$ lines, digital type detection signals of $n_1+n_2$ bits of information comprised of the $n_1$ bits of information showing the number of cycles and the $n_2$ bits of information showing the phase.

4. A position detection device comprising:
a detector configured to output a sine wave signal and a cosine wave signal having a phase in accordance with a position of a measured object;
a phase detection device configured to detect the phase based on the sine wave signal and the cosine wave signal output from the detector; and
a position calculation device configured to calculate the position of the measured object based on the phase detected by the phase detection device; wherein
the phase detection device comprises:
a sine wave sign judgment part configured to judge a sign of the sine wave signal;
a cosine wave sign judgment part configured to judge a sign of the cosine wave signal;
a magnitude judgment part configured to judge a magnitude relationship between an absolute value of the sine wave signal and an absolute value of the cosine wave signal; and
a section specifying part configured to specify which of eight sections obtained by dividing a range from 0 to $2\pi$ for each $\pi/4$ from 0 contains the phase based on the judgment results of the sine wave sign judgment part, the cosine wave sign judgment part, and the magnitude judgment part;
an arctangent calculation part configured to adjust signs of the sine wave signal and the cosine wave signal and make one of the sine wave signal and the cosine wave signal a sine wave and make the other a cosine wave so that a combination of the sign of the sine wave, the sign of the cosine wave, and the magnitude relationship between the absolute value of the sine wave and the absolute value of the cosine wave becomes constant regardless of which of the eight sections contains the phase, and calculate an approximate arctangent of the tangent based on the sine wave and cosine wave according to a procedure common to the eight sections by holding data linking a tangent and a correction value comprised by a difference between the tangent and an arctangent, specifying the corresponding correction value from among the data using the value obtained by dividing the smaller value between the absolute value of the sine wave signal and the absolute value of the cosine wave signal by the larger value between the absolute value of the sine wave signal and the absolute value of the cosine wave signal as the tangent, and adding the specified correction value to the divided value to calculate the approximate arctangent; and
a phase calculation part configured to calculate the phase based on the range of the section specified by the section specifying part and the approximate arctangent calculated by the arctangent calculation part.

* * * * *